United States Patent
Yuan et al.

(10) Patent No.: US 10,843,283 B2
(45) Date of Patent: Nov. 24, 2020

(54) APPARATUS AND METHOD FOR ELECTRICALLY MACHINING

(71) Applicants: Renwei Yuan, Shanghai (CN); Xiaobin Chen, Shanghai (CN); Dong Liu, Shanghai (CN); Yong Wu, Shanghai (CN); GENERAL ELECTRIC COMPANY, Schenectady, NY (US)

(72) Inventors: Renwei Yuan, Shanghai (CN); Xiaobin Chen, Shanghai (CN); Dong Liu, Shanghai (CN); Yong Wu, Shanghai (CN)

(73) Assignee: GENERAL ELECTRIC COMPANY, Schenectady, NY (US)

(*) Notice: Subject to any disclaimer, the term of this patent is extended or adjusted under 35 U.S.C. 154(b) by 0 days.

(21) Appl. No.: 15/504,792

(22) PCT Filed: Jun. 23, 2016

(86) PCT No.: PCT/CN2016/086821
§ 371 (c)(1),
(2) Date: Feb. 17, 2017

(87) PCT Pub. No.: WO2016/206591
PCT Pub. Date: Dec. 29, 2016

(65) Prior Publication Data
US 2018/0111210 A1    Apr. 26, 2018

(30) Foreign Application Priority Data

Jun. 26, 2015 (CN) .......................... 2015 1 0364736

(51) Int. Cl.
*B23H 7/12* (2006.01)
*B23H 9/14* (2006.01)
(Continued)

(52) U.S. Cl.
CPC ............... *B23H 7/12* (2013.01); *B23H 7/22* (2013.01); *B23H 9/14* (2013.01); *B23H 1/04* (2013.01); *B23H 3/04* (2013.01)

(58) Field of Classification Search
CPC ... B23H 1/04; B23H 3/04; B23H 7/12; B23H 7/22; B23H 9/14
(Continued)

(56) References Cited

U.S. PATENT DOCUMENTS

| 2,459,047 A | 1/1949 | Scharf |
| 2,744,991 A | 5/1956 | Ballhausen |

(Continued)

FOREIGN PATENT DOCUMENTS

| CN | 2644071 Y | 9/2004 |
| CN | 102107304 A | 6/2011 |

(Continued)

OTHER PUBLICATIONS

Wang, C.C., et al., "Blind-hole drilling of Al2O3/6061Al composite using rotary electro-discharge machining," Journal of Materials Processing Technology, vol. 102, pp. 90-102 (2000).

(Continued)

*Primary Examiner* — Dana Ross
*Assistant Examiner* — Joseph W Iskra
(74) *Attorney, Agent, or Firm* — Dority & Manning, P.A.

(57) ABSTRACT

An apparatus for electrically machining including a rotatable shaft and an electrode for electrically machining is disclosed. The electrode is movably connected to the rotatable shaft. When the rotatable shaft is rotated, the electrode rotates together with the rotatable shaft and moves relative to the rotatable shaft under an action of centrifugal force. Further disclosed is a method for electrically machining including: movably connecting an electrode to a rotatable shaft; inserting the rotatable shaft into a hole in a workpiece, (Continued)

and keeping a gap between the electrode and the workpiece, wherein the hole has a first diameter; powering on the electrode and the workpiece; rotating the rotatable shaft in the hole to generate centrifugal force; and pushing the electrode relative to the rotatable shaft towards the workpiece under an action of the centrifugal force to remove a portion of a material of the hole.

18 Claims, 8 Drawing Sheets

(51) Int. Cl.
*B23H 7/22* (2006.01)
*B23H 1/04* (2006.01)
*B23H 3/04* (2006.01)

(58) Field of Classification Search
USPC ......... 219/69.11, 69.12, 69.14, 69.15, 69.16, 219/69.17; 204/192.38, 298.41, 192.32, 204/298.31, 298.34; 427/458, 540, 580
See application file for complete search history.

(56) References Cited

U.S. PATENT DOCUMENTS

| | | | |
|---|---|---|---|
| 2,909,640 A | 10/1959 | Fairbrother | |
| 3,443,458 A | 5/1969 | Ohrnberger et al. | |
| 4,144,936 A * | 3/1979 | Evans | B23H 9/00 166/298 |
| 4,215,261 A | 7/1980 | Briffod | |
| 4,376,020 A | 3/1983 | Andrews | |
| 4,476,368 A | 10/1984 | Cammann et al. | |
| 7,964,817 B2 | 6/2011 | MacGregor | |
| 8,517,645 B2 | 8/2013 | Harif et al. | |
| 2001/0027749 A1 * | 10/2001 | Kinbara | B23H 1/022 118/308 |
| 2008/0230378 A1 | 9/2008 | Lee et al. | |

FOREIGN PATENT DOCUMENTS

| | | |
|---|---|---|
| CN | 204800087 U | 11/2015 |
| DE | 4421246 C1 | 11/1995 |
| FR | 2475064 A1 | 8/1981 |
| JP | S5290885 A | 7/1977 |
| JP | 2000-000720 A | 1/2000 |
| JP | 2000000720 * | 1/2000 |
| JP | 2007/276062 A | 10/2007 |
| JP | 2010/125541 A | 6/2010 |
| JP | 2013-180389 A | 9/2013 |

OTHER PUBLICATIONS

International Search Report and Written Opinion issued in connection with related PCT Application No. PCTCN2016/086821 dated Sep. 26, 2016.
Machine Translated Japanese Office Action Corresponding to Application No. 2017506998 dated Jun. 11, 2020.

* cited by examiner

APPARATUS AND METHOD FOR ELECTRICALLY MACHINING

TECHNICAL FIELD

The present disclosure generally relates to the machining field, and in particular, to an apparatus for electrically machining and a method for electrically machining.

BACKGROUND

At present, a lathe or a miller is generally used for machining a ring groove on an internal rotation surface of a workpiece with an internal rotation hole. However, this conventional machining method is generally time consuming, and requires a highly rigid machining tool.

In addition, especially when the internal rotation hole of the workpiece is a non-centrosymmetric hole, in a machining procedure, because end faces of the internal rotation hole is asymmetric, stress exerted on a cutting tool that is in contact with the end faces is uneven, thereby generating vibration. Further, different levels of rippling are generated on a ring surface of a machined ring groove, resulting in affecting roughness of the ring surface of the machined ring groove and affecting machining quality of the workpiece.

Therefore, it is necessary to provide an improved machining apparatus and machining method to resolve at least one of the foregoing problems.

BRIEF DESCRIPTION

An aspect of the present disclosure provides an apparatus for electrically machining. The apparatus comprises a rotatable shaft and an electrode for electrically machining, and the electrode is movably connected to the rotatable shaft. When the rotatable shaft is rotated, the electrode rotates together with the rotatable shaft and moves relative to the rotatable shaft under an action of centrifugal force, and a moving distance of the electrode is controlled based on a rotary speed of the rotatable shaft.

Another aspect of the present disclosure provides a method for electrically machining, The method comprises: movably connecting an electrode to a rotatable shaft; inserting the rotatable shaft into a hole in a workpiece, and keeping a gap between the electrode and the workpiece, wherein the hole has a first diameter; powering on the electrode and the workpiece; rotating the rotatable shaft in the hole to generate centrifugal force; and pushing the electrode relative to the rotatable shaft towards the workpiece under an action of the centrifugal force to remove material of a portion of the hole, so that the hole has a second diameter, wherein the second diameter is larger than the first diameter.

The apparatus for electrically machining and the method for electrically machining according to embodiments of the present disclosure are simple, easy to implement, and cost effective.

BRIEF DESCRIPTION OF DRAWINGS

These and other characteristics, aspects, and advantages of the present disclosure can be understood better with reference to the accompanying drawings when reading the following detailed descriptions. In the accompanying drawings, the same element reference numbers are used to denote the same parts in all the accompanying drawings.

DETAILED DESCRIPTION

To help persons skilled in the art to clearly understand the protection scope of the present disclosure, the following describes embodiments of the present disclosure with reference to the accompanying drawings. In the following detailed descriptions of the embodiments, this specification does not describe some commonly known functions or structures, to prevent unnecessary details from affecting the disclosure of the present disclosure.

Unless otherwise defined, technical terms or scientific terms used in the claims and the specification should be ordinary meanings understood by persons of ordinary skill in the art of the present disclosure. "First", "second", and similar words used in the specification and the claims do not denote any order, quantity, or importance, but are merely used to distinguish different components. "A" or "an" and similar words do not constitute a limitation on a quantity, but indicate the presence of at least one. "Include" or "have" and other similar words imply that an element or object appearing before the "include" or "have" covers enumerated elements or objects and equivalent elements thereof appearing after the "include" or "have", without excluding other elements or objects. "Connect" or "connected" and similar words are not limited to a physical or mechanical connection, but may include an electrical connection, either direct or indirect. Moreover, the term "based on" refers to "at least partially based on".

It should be noted that, in the accompanying drawings of the present disclosure, to make illustrations and elements clearly visible, elements in some of the accompanying drawings are not marked by section lines.

Figure 1:
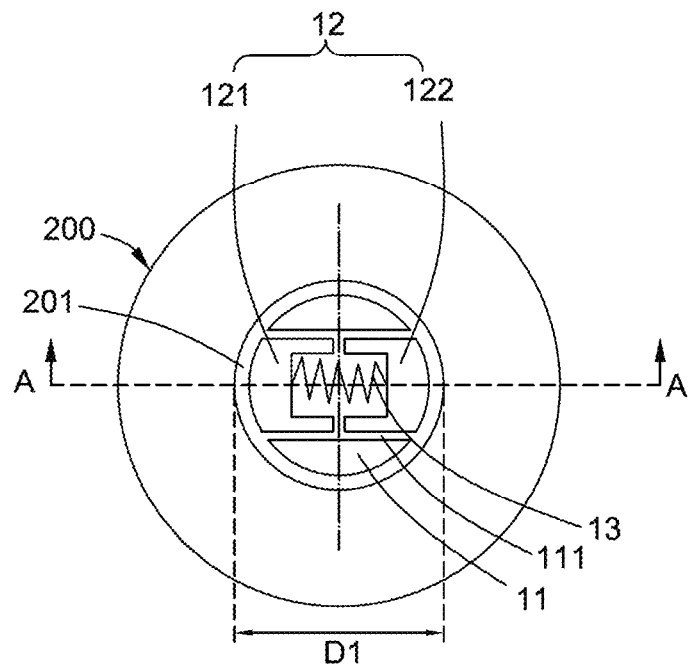
FIG. 1 is a schematic cross-sectional view of an apparatus for electrically machining before workpiece machining according to a first embodiment of the present disclosure.
Figure 2:
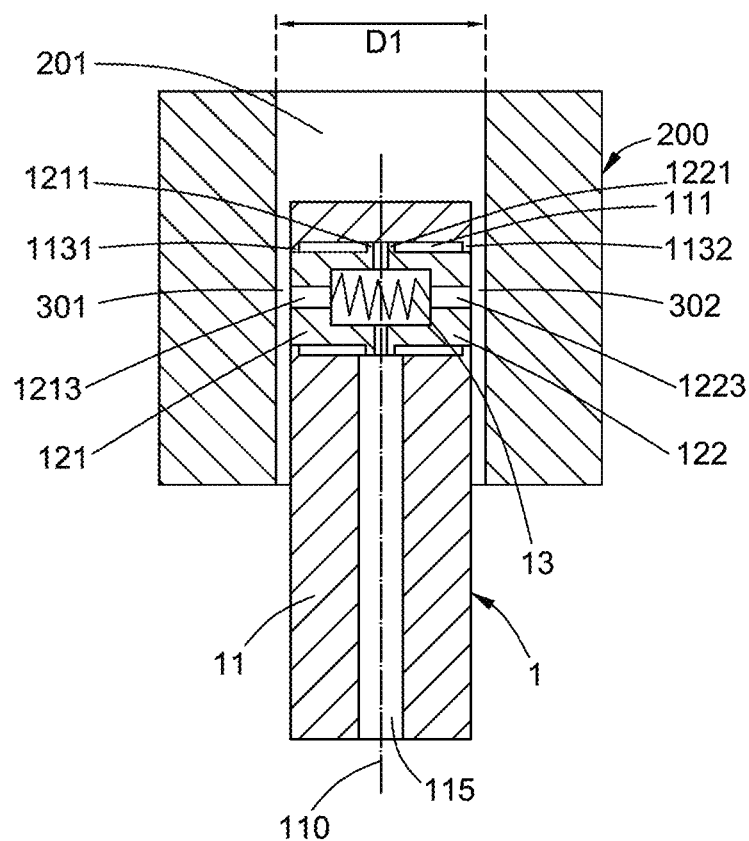
FIG. 2 is a schematic cutaway diagram along A-A surface in FIG. 1.
Figure 3:
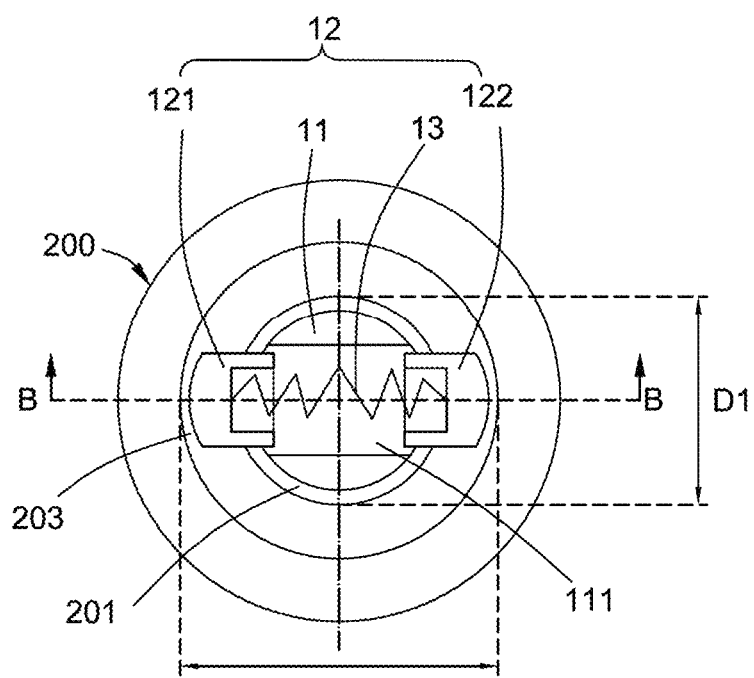
FIG. 3 is a schematic cross-sectional view of the apparatus for electrically machining during workpiece machining according to the first embodiment of the present disclosure.
Figure 4:
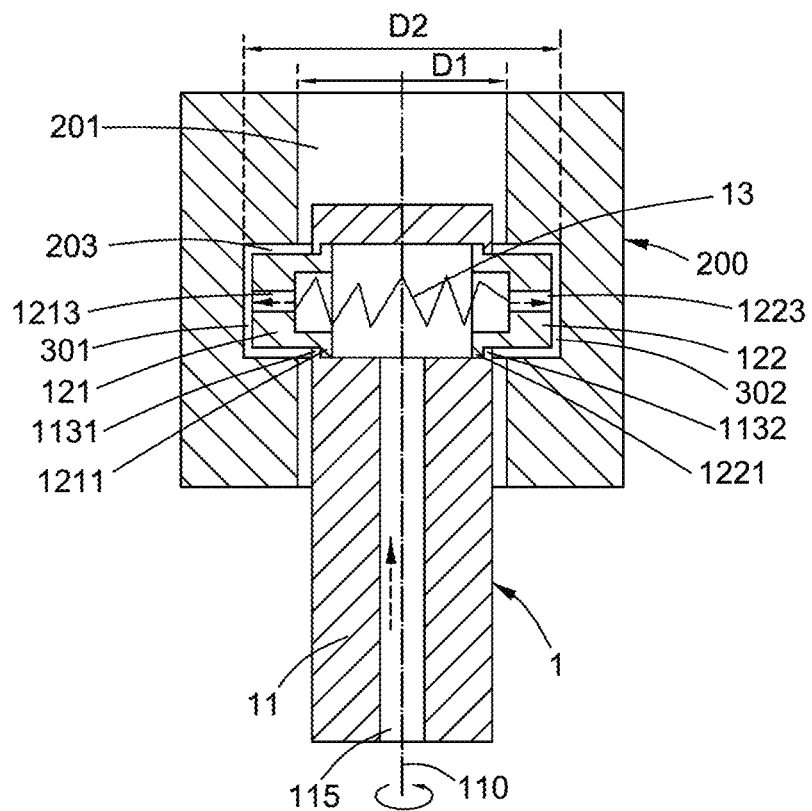
FIG. 4 is a schematic cutaway diagram along B-B surface in FIG. 3.

FIG. 1 to FIG. 4 illustrate schematic diagrams of an apparatus 1 for electrically machining according to a first embodiment of the present disclosure. FIG. 1 and FIG. 2 illustrate schematic diagrams of the apparatus 1 for electrically machining before a rotatable shaft 11 of the apparatus 1 is rotated, and FIG. 3 and FIG. 4 illustrate schematic diagrams of the apparatus 1 for electrically machining after the rotatable shaft 11 of the apparatus 1 is rotated. As shown in FIG. 1 and FIG. 2, the apparatus 1 for electrically machining according to the first embodiment of the present disclosure includes the rotatable shaft 11 and an electrode 12 for electrically machining. The rotatable shaft 11 has a rotation axis 110. The electrode 12 includes a first electrode 121 and a second electrode 122. The first electrode 121 and the second electrode 122 are movably connected to the rotatable shaft 11. In addition, the first electrode 121 and the second electrode 122 are symmetrically disposed relative to the rotation axis 110 of the rotatable shaft 11, that is, the first electrode 121 and the second electrode 122 are evenly distributed on the rotatable shaft 11. As shown in FIG. 3 and FIG. 4, when the rotatable shaft 11 is rotated, the first electrode 121 and the second electrode 122 can rotate together with the rotatable shaft 11 around the rotation axis 110 of the rotatable shaft 11. At the same time, the rotatable shaft 11 is rotated to generate centrifugal force. The first electrode 121 and the second electrode 122 can translate far away from each other relative to the rotatable shaft 11 under an action of the centrifugal force, that is, move in parallel towards opposite directions. In addition, a moving distance (not labeled) of the first electrode 121 and the second electrode 122 can be controlled based on a rotary speed of the rotatable shaft 11.

As shown in FIG. 1 and FIG. 2, in an embodiment, an elastic element, for example, a spring 13, is connected between the first electrode 121 and the second electrode 122. Under an action of elastic force of the spring 13, the first electrode 121 and the second electrode 122 are positioned relative to the rotatable shaft 11. In an optional embodiment, the first electrode 121 and the second electrode 122 may also be separately positioned relative to the rotatable shaft 11 by using two independent springs of their own.

In an embodiment, the rotatable shaft 11 is provided with a receiving space 111 for receiving the first electrode 121 and the second electrode 122. Moreover, the first electrode 121 and the second electrode 122 are movable in the receiving space 111. As shown in FIG. 1 and FIG. 2, before the rotatable shaft 11 is rotated, the first electrode 121 and the second electrode 122 can be accommodated in the receiving space 111 of the rotatable shaft 11, thereby reducing size of the apparatus 1 for electrically machining and playing an effect for protecting the first electrode 121 and the second electrode 122. As shown in FIG. 3 and FIG. 4, after the rotatable shaft 11 is rotated, the first electrode 121 and the second electrode 122 can translate, relative to the rotatable shaft 11, far away from each other in the receiving space 111 under the action of the centrifugal force. The apparatus 1 for electrically machining according to the first embodiment of the present disclosure is not limited to providing the receiving space 111 on the rotatable shaft 11. In another optional or additional example, the first electrode 121 and the second electrode 122 may also be directly connected to an end or a side surface of the rotatable shaft 11.

In an embodiment, the rotatable shaft 11 is provided with limiting portions 1131 and 1132. The limiting portions 1131 and 1132 on the rotatable shaft 11 can limit maximum moving distances of the first electrode 121 and the second electrode 122 respectively. In this embodiment, the receiving space 111 of the rotatable shaft 11 is provided with the limiting portions 1131 and 1132. Correspondingly, the first electrode 121 and the second electrode 122 are provided with stoppers 1211 and 1221 respectively. When the first electrode 121 and the second electrode 122 separately move to the maximum moving distances of their own, the stoppers 1211 and 1221 of the first electrode 121 and the second electrode 122 cooperate with the limiting portions 1131 and 1132 of the rotatable shaft 11 respectively, so as to prevent the first electrode 121 and the second electrode 122 from continuing to move relative to the rotatable shaft 11.

In an embodiment, the rotatable shaft 11 is movable along the rotation axis 110 of the rotatable shaft 11. Therefore, by controlling movement of the rotatable shaft 11 along the rotation axis 110 (that is, axial movement), movement of the first electrode 121 and the second electrode 122 in a direction parallel to the rotation axis 110 of the rotatable shaft 11 (that is, axial movement) can be further controlled.

The apparatus 1 for electrically machining according to the first embodiment may use an electrical discharge machining (EDM) process, an electro-chemical machining (ECM) process, or an electro-chemical discharge machining (ECDM) process. The following uses the electrical discharge machining process as an example to describe the apparatus 1 for electrically machining according to the first embodiment. Certainly, it should be understood that, use of the electro-chemical machining process or the electro-chemical discharge machining process may be slightly different from use of the electrical discharge machining process. Such simple variations do not affect the innovation essence of the apparatus 1 for electrically machining according to the first embodiment of the present disclosure.

In an embodiment, the rotatable shaft 11 is provided with a first passage 115 for transmitting a working fluid. The first electrode 121 and the second electrode 122 are respectively provided with a second passage 1213 and a third passage 1223 for transmitting the working fluid. The first passage 115, the second passage 1213, and the third passage 1223 are fluidly communicated. By using the communicated first passage 115, second passage 1213, and third passage 1223, the working fluid can be transmitted to an area that the first electrode 121 and the second electrode 122 need to machine. However, a setting manner of the passages for transmitting the working fluid in the present disclosure is not limited thereto. Another proper setting manner may also be used, as long as a passage setting can enable the working fluid to be transmitted to the area that the first electrode 121 and the second electrode 122 need to machine. Moreover, whether the used working fluid is electrically conductive or its conductivity strength may be determined according to a machining process used by the apparatus 1 for electrically machining. For example, when the apparatus 1 for electrically machining uses the EDM process, the working fluid may be a dielectric fluid; when the apparatus 1 for electrically machining uses the ECM process, the working fluid may be an electrolyte, and preferentially an electrolyte with strong conductivity; when the apparatus 1 for electrically machining uses the ECDM process, the working fluid may be an electrolyte with weak conductivity.

Figure 5:
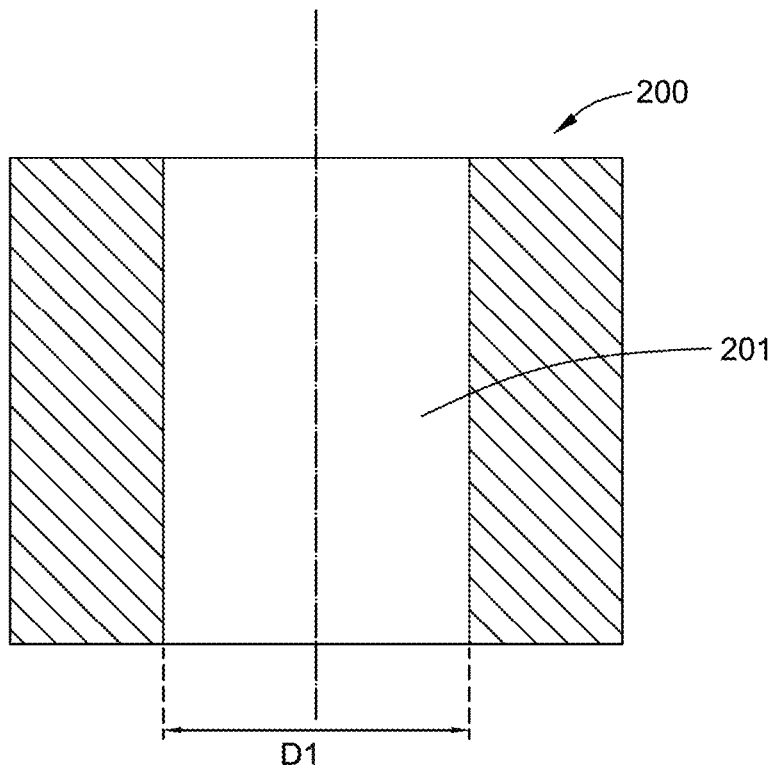
FIG. 5 is a schematic cutaway diagram of a workpiece according to an embodiment.

In an embodiment of the present disclosure, the apparatus 1 for electrically machining may machine a workpiece 200 with a hole 201. As an example, the hole 201 of the workpiece 200 may be a rotation hole, as shown in FIG. 5.

FIG. 1 and FIG. 2 illustrate schematic diagrams of the apparatus 1 for electrically machining before the workpiece 200 is machined. With reference to FIG. 1 and FIG. 2, when the apparatus 1 for electrically machining needs to machine the workpiece 200, the rotatable shaft 11 of the apparatus 1 for electrically machining may be inserted into the hole 201 of the workpiece 200, and certain gaps 301 and 302 are kept between the workpiece 200 and the first electrode 121 and between the workpiece 200 and the second electrode 122 respectively. Before the apparatus 1 for electrically machining machines the workpiece 200, the first electrode 121 and the second electrode 122 remain in the receiving space 111 of the rotatable shaft 11 under the action of the elastic force of the spring 13. Moreover, in combination with FIG. 5, before the workpiece 200 is machined, the hole 201 of the workpiece 200 has a first diameter D1.

FIG. 3 and FIG. 4 illustrate schematic diagrams of the apparatus 1 for electrically machining during machining the workpiece 200. With reference to FIG. 3 and FIG. 4, when the apparatus 1 for electrically machining machines the workpiece 200, the first electrode 121, the second electrode 122, and the workpiece 200 are powered on, so that opposite electric polarities are carried between the first electrode 121 and the workpiece 200 and between the second electrode 122 and the workpiece 200. Moreover, the rotatable shaft 11 is rotated in the hole 201 of the workpiece 200. Rotation of the rotatable shaft 11 drives the first electrode 121 and the second electrode 122 to move together. The rotatable shaft 11 is rotated to generate the centrifugal force. The first electrode 121 and the second electrode 122 can translate, towards the workpiece 200, far away from each other relative to the rotatable shaft 11 under the action of the centrifugal force. At this time, the spring 13 is extended. with the movement of the first electrode 121 and the second electrode 122, electrical discharges are generated between the first electrode 121 and the workpiece 200 that have opposite electric polarities and between the second electrode 122 and the workpiece 200 that have opposite electric polarities, so as to remove material of a portion of the hole 201 of the workpiece 200. Therefore, in combination with FIG. 6, after the workpiece 200 is machined, a ring groove 203 is further formed in the hole 201 of the workpiece 200. The ring groove 203 has a second diameter D2, that is, the hole 201 of the workpiece 200 has a second diameter D2 after machining. The second diameter D2 is greater than the first diameter D1. The ring groove 203 includes a cylindrical surface 2031 that has the second diameter D2 and a flat surface 2032.

The apparatus 1 for electrically machining according to the first embodiment of the present disclosure has a simple structure and a low cost and is easy to implement. In addition, during the machining procedure, the first electrode 121 and the second electrode 122 can simultaneously move towards the workpiece 200. Therefore, the electrical discharges can be respectively generated in the gap 301 between the first electrode 121 and the workpiece 200 and in the gap 302 between the second electrode 122 and the workpiece 200, and the first electrode 121 and the second electrode 122 of the apparatus 1 for electrically machining can simultaneously perform machining on the workpiece 200. Because the first electrode 121 and the second electrode 122 are symmetrically disposed relative to the rotation axis 110 of the rotatable shaft 11, force exerted on the apparatus 1 for electrically machining is even during the entire machining procedure, thereby further improving surface machining flatness of the workpiece 200.

The moving distance of the first electrode 121 and the second electrode 122 may be controlled based on the rotary speed of the rotatable shaft 11, so as to control size of the gap 301 between the first electrode 121 and the workpiece 200 and size of the gap 302 between the second electrode 122 and the workpiece 200. Moreover, a value of the second diameter D2 of the hole 201 of the workpiece 200 after machining may be controlled.

When the workpiece 200 is machined, via the first passage 115, the second passage 1213, and the third passage 1223 that are fluidly communicated among the rotatable shaft 11, the first electrode 121, and the second electrode 122, a pressured working fluid may be supplied to the area that the first electrode 121 and the second electrode 122 need to machine, and specifically to the gap 301 between the first electrode 121 and the workpiece 200 and the gap 302 between the second electrode 122 and the workpiece 200, as shown in a dotted arrow in FIG. 4. Therefore, during machining the workpiece 200, the pressured working fluid can flush the machining area of the workpiece 200. The flushing by the pressured working fluid can in time drain scraps generated during the machining procedure, thereby ensuring cleanness of the machining area of the workpiece 200.

The rotation of the rotatable shaft 11 is properly controlled, so that a portion of the hole 201 of the workpiece 200 that is obtained after material removing (that is, the ring groove 203) has a complete cylindrical surface or a part of a cylindrical surface. In addition, because the rotatable shaft 11 is movable along the rotation axis 110 of the rotatable shaft 11, a depth of the ring groove 203 in the direction parallel to the rotation axis 110 of the rotatable shaft 11 (that is, an axial depth) can be controlled by continuously controlling the rotatable shaft 11 to move along the rotation axis 110 of the rotatable shaft 11. Further, the rotatable shaft 11 may be intermittently controlled to move along the rotation axis 110 of the rotatable shaft 11, so that the ring grooves 203 are distributed at intervals, and a plurality of ring grooves 203 distributed at intervals can be machined in the hole 201 of the workpiece 200. Therefore, rotation and axial movement of the rotatable shaft 11 may be properly controlled according to an actual requirement of the to-be-machined workpiece 200.

Figure 6:
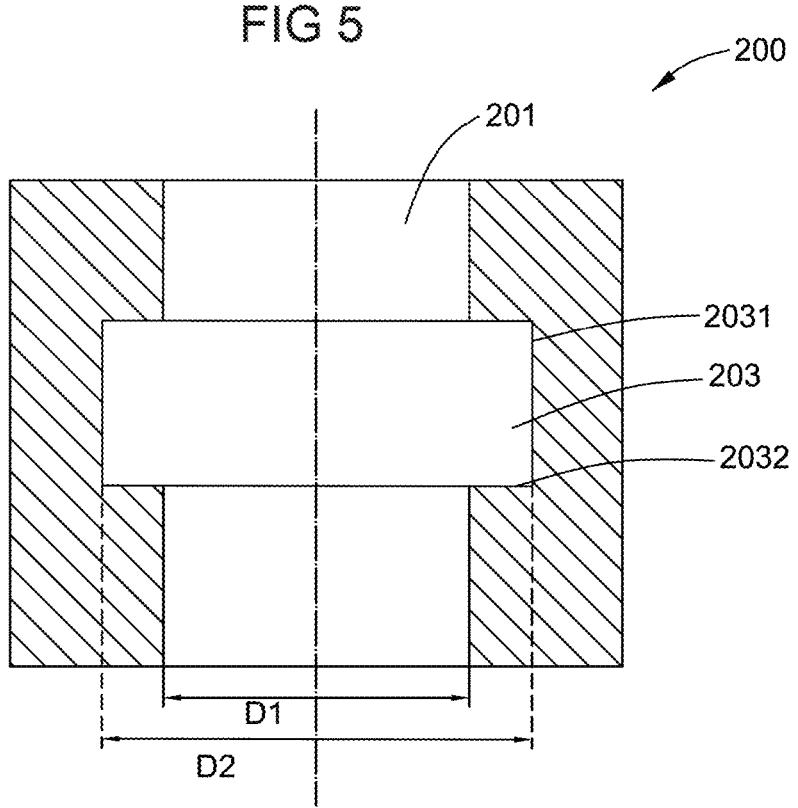
FIG. 6 is a schematic cutaway diagram of the workpiece in FIG. 5 after machining.

FIG. 5 and FIG. 6 illustrate schematic diagrams of a workpiece 200 according to an embodiment. As shown in FIG. 5 and FIG. 6, in an embodiment of the present disclosure, the apparatus 1 for electrically machining may machine a regularly structured workpiece 200 that has a rotation hole 201. With reference to FIG. 5, before machining, the hole 201 of the workpiece 200 has a first diameter D1, and the hole 201 of the workpiece 200 is symmetric relative to a rotation central line. In an example, the apparatus 1 for electrical machining may start the machining from a middle part of the hole 201 of the workpiece 200. Therefore, with reference to FIG. 6, after the machining, a ring groove 203 may be further obtained by machining in the middle part of the hole 201 of the workpiece 200. The ring groove 203 has a cylindrical surface 2031 with a second diameter D2 and includes bottom and top flat surfaces 2032.

Figure 7:
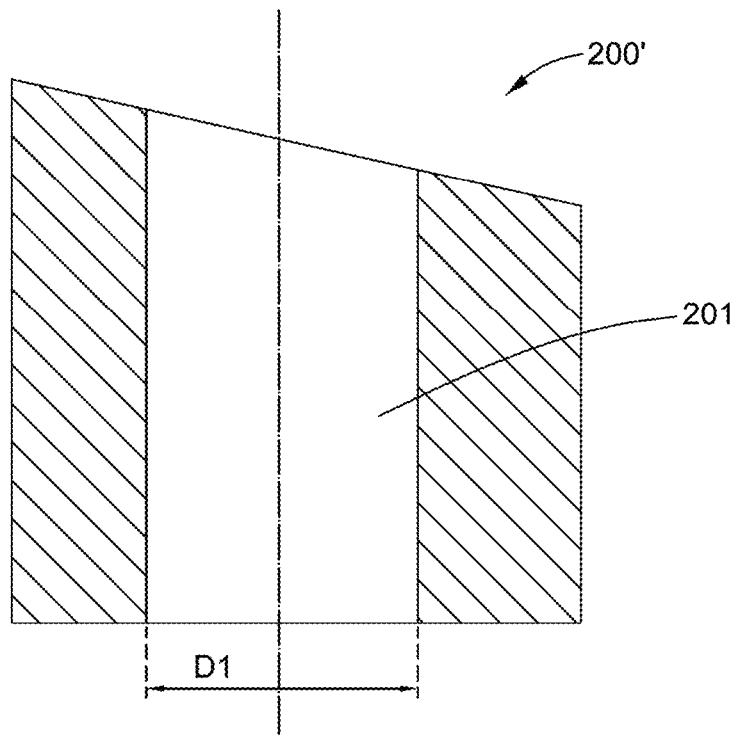
FIG. 7 is a schematic cutaway diagram of a workpiece according to another embodiment.
Figure 8:
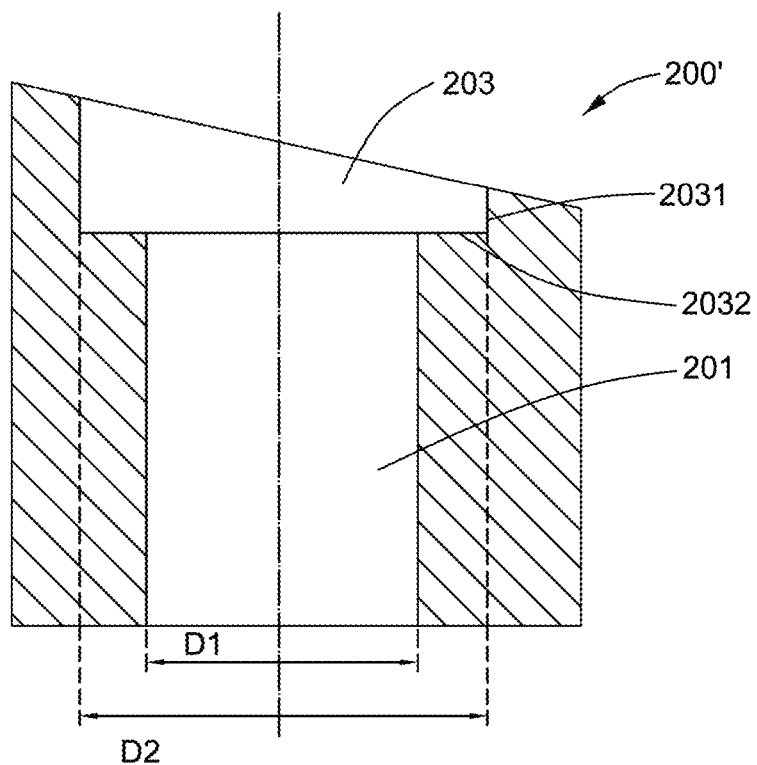
FIG. 8 is a schematic cutaway diagram of the workpiece in FIG. 7 after machining.

FIG. 7 and FIG. 8 illustrate schematic diagrams of a workpiece 200' according to another embodiment. As shown in FIG. 7 and FIG. 8, in another embodiment of the present disclosure, an apparatus 1 for electrically machining may also machine an irregularly structured workpiece 200' that has a rotation hole 201. With reference to FIG. 7, before machining, the hole 201 of the workpiece 200' also has a first diameter D1, but the hole 201 of the workpiece 200' is asymmetric relative to a rotation central line. For example, the hole 201 of the workpiece 200' has an end with varied heights in a direction parallel to a rotation axis 110 of a rotatable shaft 11 (that is, an axial direction). In an example, the apparatus 1 for electrically machining may also start the machining from the end of the hole 201 of the workpiece 200'. For example, in a case in which an electrode 12 includes a first electrode 121 and a second electrode 122, the first electrode 121 and the second electrode 122 are pushed towards the end of the hole 201 in opposite directions under an action of centrifugal force, so as to remove material of at least a portion of the end of the hole 201. Therefore, with reference to FIG. 8, after the machining, a ring groove 203 may be further machined at the end of the hole 201 of the workpiece 200'. The ring groove 203 has a cylindrical surface 2031 with a second diameter D2 and includes a bottom flat surface 2032. The hole 201 of the workpiece 200' has the end with varied heights in the axial direction before the machining, so the ring groove 203 formed after the machining also has an end with varied heights in the axial direction.

Figure 9:
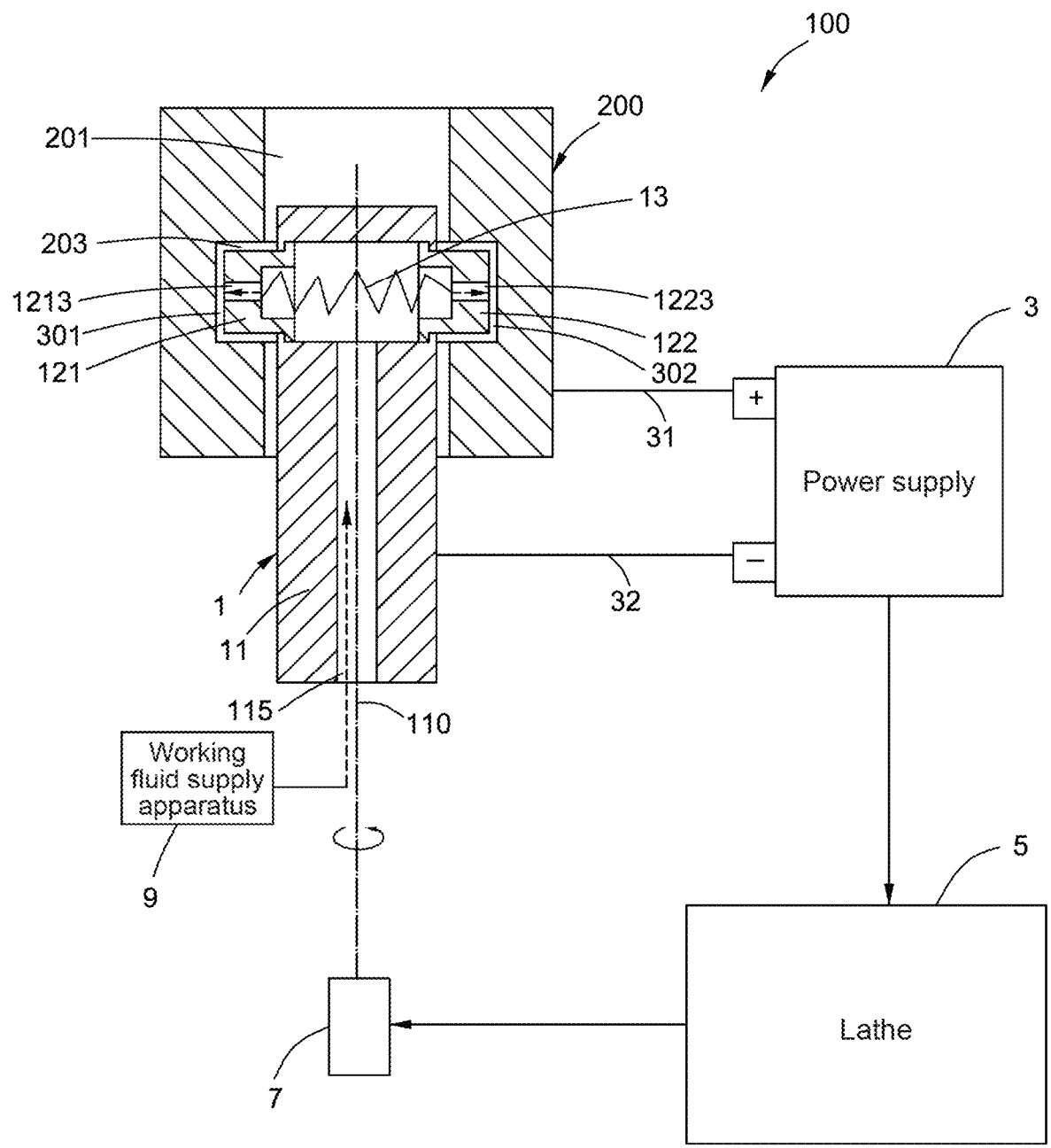
FIG. 9 is a schematic block diagram of a system for electrically machining according to an embodiment of the present disclosure.

FIG. 9 is a schematic block diagram of a system 100 for electrically machining during a procedure of machining a workpiece 200 according to an embodiment of the present disclosure. As shown in FIG. 9, a system 100 for electrically machining according to an embodiment of the present disclosure includes the apparatus 1 for electrically machining according to the first embodiment of the present disclosure, a power supply 3, a lathe 5, a servo motor 7 disposed on the lathe 5, and a working fluid supply apparatus 9.

The power supply 3 includes a positive (+) lead 31 and a negative (−) lead 32. In FIG. 9, the positive lead 31 of the power supply 3 is shown as being connected to the to-be-machined workpiece 200, so that the to-be-machined workpiece 200 carries positive electricity after the power supply 3 is started. The negative lead 32 of the power supply 3 is shown as being connected to the rotatable shaft 11 of the apparatus 1 for electrically machining. The rotatable shaft 11 is electrically connected to the first electrode 121 and the second electrode 122, so that the negative lead 32 of the power supply 3 may be indirectly connected to the first electrode 121 and the second electrode 122 of the apparatus 1 for electrically machining via the rotatable shaft 11. Therefore, the first electrode 121 and the second electrode 122 carry negative electricity after the power supply 3 is started. However, the present disclosure is not limited to that: the power supply 3 supplies negative electricity to the first electrode 121 and the second electrode 122, and the power supply 3 supplies positive electricity to the workpiece 200. In another embodiment of the present disclosure, the power supply 3 may also supply positive electricity to the first electrode 121 and the second electrode 122, and the power supply 3 may supply negative electricity to the workpiece 200. Such the simple variation manner does not depart from the innovation essence of the present disclosure. In addition, the positive and negative leads 31 and 32 of the power supply 3 may also be connected to the first electrode 121, the second electrode 122, and the workpiece 200 in another proper manner. Actually, any connection manner of the power supply 3 that enables opposite electric polarities to be supplied respectively between the first electrode 121 and the workpiece 200 and between the second electrode 122 and the workpiece 200 shall fall within the protection scope of the present disclosure.

The power supply 3 can communicate with the lathe 5. The servo motor 7 disposed on the lathe 5 can drive the rotatable shaft 11 of the apparatus 1 for electrically machining to rotate. The working fluid supply apparatus 9 can supply a pressured working fluid respectively to the gap 301 between the first electrode 121 and the workpiece 200 and the gap 302 between the second electrode 122 and the workpiece 200 via the first passage 115, the second passage 1213, and the third passage 1223 of the apparatus 1 for electrically machining that are fluidly communicated with one another when the workpiece 200 is machined.

In an embodiment of the system 100 for electrically machining according to the present disclosure, the power supply 3 of the system 100 for electrically machining may further detect whether a short circuit occurs between the first electrode 121 and the workpiece 200 and between the second electrode 122 and the workpiece 200. When the power supply 3 detects that a short circuit occurs, the power supply 3 sends a short circuit signal to the lathe 5. After receiving the short circuit signal, the servo motor 7 on the lathe 5 lowers the rotary speed of the rotatable shaft 11 of the apparatus 1 for electrically machining. Therefore, under an action of elastic force of the spring 13 of the apparatus 1 for electrically machining, the spring 13 pulls back the first electrode 121 and the second electrode 122, so as to increase sizes of the gap 301 between the first electrode 121 and the workpiece 200 and the gap 302 between the second electrode 122 and the workpiece 200, thereby eliminating the short circuit and enabling the apparatus 1 for electrically machining to return to a normal operating state.

In another embodiment of the system 100 for electrically machining according to the present disclosure, the power supply 3 of the system 100 for electrically machining may further detect whether an open circuit occurs between the first electrode 121 and the workpiece 200 and between the second electrode 122 and the workpiece 200. When the power supply 3 detects that an open circuit occurs, the power supply 3 sends an open circuit signal to the lathe 5. After receiving the open circuit signal, the servo motor 7 on the lathe 5 increases the rotary speed of the rotatable shaft 11 of the apparatus 1 for electrically machining. Therefore, the first electrode 121 and the second electrode 122 further move far away from each other, elastic force of a spring 13 increases, and sizes of the gap 301 between the first electrode 121 and the workpiece 200 and the gap 302 between the second electrode 122 and the workpiece 200 are decreased, thereby eliminating the open circuit and enabling the apparatus 1 for electrically machining to return to a normal operating state.

Similarly, the system 100 for electrically machining according to the present disclosure may also machine the workpiece 200' shown in FIG. 7 and FIG. 8.

Figure 10:
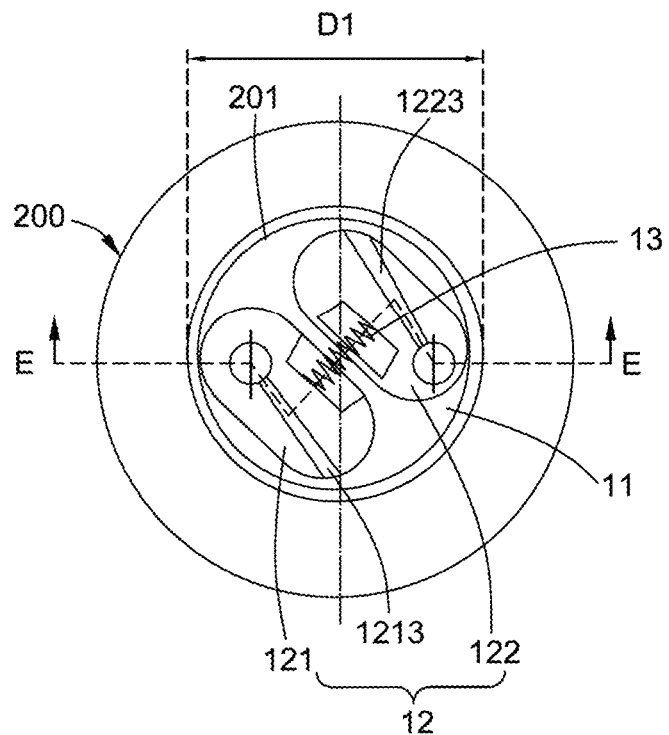
FIG. 10 is a schematic cross-sectional view of an apparatus for electrically machining before workpiece machining according to a second embodiment of the present disclosure.
Figure 11:
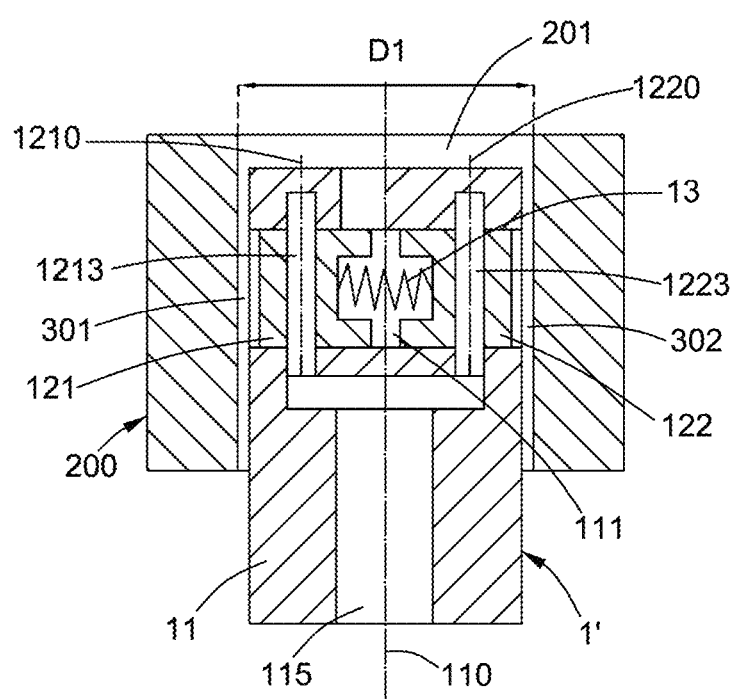
FIG. 11 is a schematic cutaway diagram along E-E surface in FIG. 10.
Figure 12:
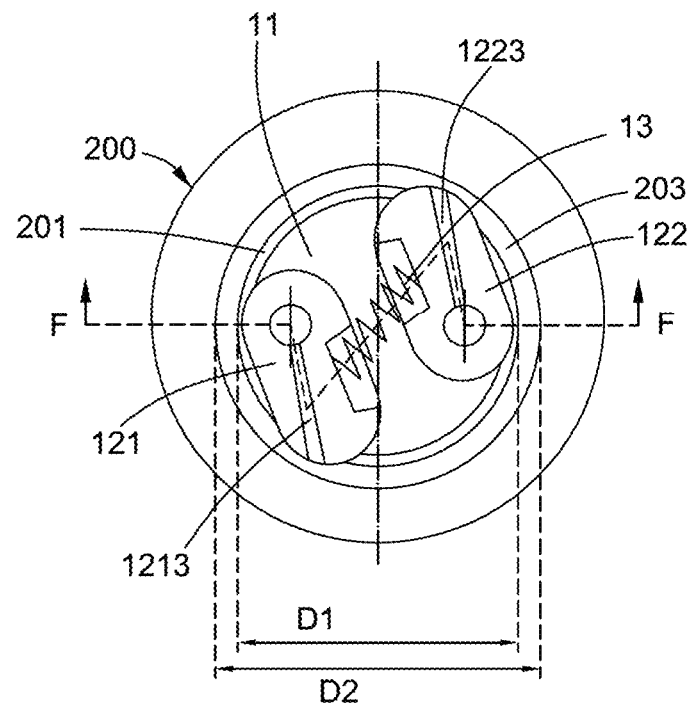
FIG. 12 is a schematic cross-sectional view of the apparatus for electrically machining during workpiece machining according to the second embodiment of the present disclosure.
Figure 13:
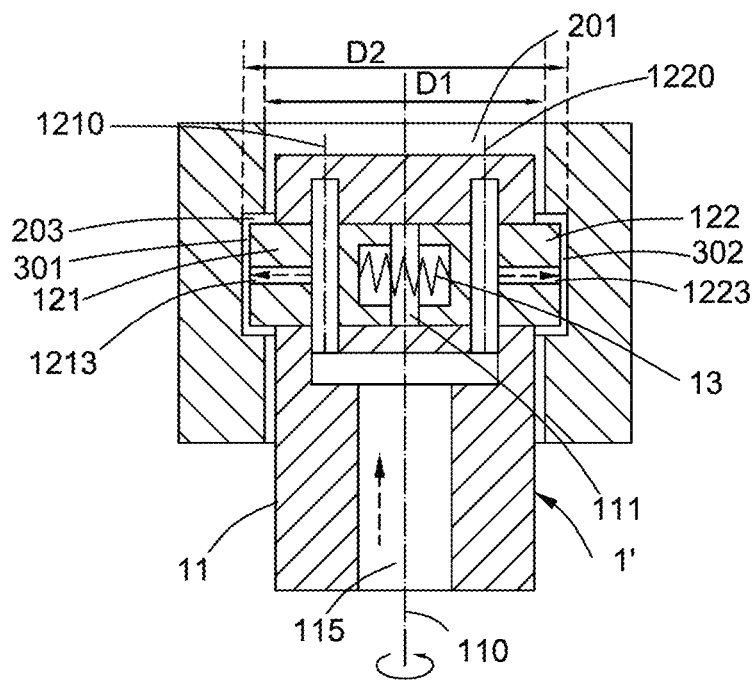
FIG. 13 is a schematic cutaway diagram along F-F surface in FIG. 12.

FIG. 10 to FIG. 13 illustrate schematic diagrams of an apparatus 1' for electrically machining according to a second embodiment of the present disclosure. FIG. 10 and FIG. 11 illustrate schematic diagrams of the apparatus 1' for electrically machining before the workpiece 200 is machined. FIG. 12 and FIG. 13 illustrate schematic diagrams of the apparatus 1' for electrically machining during a procedure of machining the workpiece 200. As shown in FIG. 10 and FIG. 11, similar to the apparatus 1 for electrically machining according to the first embodiment, the apparatus 1' for electrically machining according to the second embodiment may also include a rotatable shaft 11 and an electrode 12 for electrically machining. The rotatable shaft 11 has a rotation axis 110. The electrode 12 also includes a first electrode 121 and a second electrode 122. The first electrode 121 and the second electrode 122 are movably connected to the rotatable shaft 11. In addition, the first electrode 121 and the second electrode 122 are symmetrically disposed relative to the rotation axis 110 of the rotatable shaft 11. However, different from the apparatus 1 for electrically machining according to the first embodiment, in the apparatus 1' for electrically machining according to the second embodiment, the first electrode 121 and the second electrode 122 further have rotation axes 1210 and 1220 of their own.

With reference to FIG. 12 and FIG. 13, similar to the apparatus 1 for electrically machining according to the first embodiment, in the apparatus 1' for electrically machining according to the second embodiment, when the rotatable shaft 11 is rotated, the first electrode 121 and the second electrode 122 can rotate together with the rotatable shaft 11 around the rotation axis 110 of the rotatable shaft 11. Moreover, the rotatable shaft 11 is rotated to generate centrifugal force. However, different from the apparatus 1 for electrically machining according to the first embodiment, in the apparatus 1' for electrically machining according to the second embodiment, the first electrode 121 and the second electrode 122 can further rotate towards opposite directions around their own rotation axes 1210 and 1220 under an action of the centrifugal force. Therefore, the first electrode 121 and the second electrode 122 move relative to the rotatable shaft 11. In addition, a rotational angle of the first electrode 121 and the second electrode 122 can also be controlled based on a rotary speed of the rotatable shaft 11, thereby further controlling a moving distance of the first electrode 121 and the second electrode 122 relative to the rotatable axis 11.

In the apparatus 1' for electrically machining according to the second embodiment, the rotatable shaft 11 may also be provided with a limiting portion (not shown) for limiting a maximum moving distance of the first electrode 121 and the second electrode 122.

With reference to FIG. 10 and FIG. 11, when the apparatus 1' for electrically machining needs to machine the workpiece 200, the rotatable shaft 11 of the apparatus 1' for electrically machining may be inserted into the hole 201 of the workpiece 200, and certain gaps 301 and 302 are kept between the workpiece 200 and the first electrode 121 and between the workpiece 200 and the second electrode 122 respectively. Before the apparatus 1' for electrically machining machines the workpiece 200, the first electrode 121 and the second electrode 122 remain in the receiving space 111 of the rotatable shaft 11 under an action of elastic force of the spring 13. Moreover, in combination with FIG. 5, before the workpiece 200 is machined, the hole 201 of the workpiece 200 has the first diameter D1.

With reference to FIG. 12 and FIG. 13, when the apparatus 1' for electrically machining machines the workpiece 200, the first electrode 121, the second electrode 122, and the workpiece 200 are powered on, so that opposite electric polarities are carried between the first electrode 121 and the workpiece 200 and between the second electrode 122 and the workpiece 200. Moreover, the rotatable shaft 11 is rotated in the hole 201 of the workpiece 200. Rotation of the rotatable shaft 11 drives the first electrode 121 and the second electrode 122 to rotate together. The rotatable shaft 11 is rotated to generate the centrifugal force. The first electrode 121 and the second electrode 122 can rotate towards opposite directions around their own rotation axes 1210 and 1220 under the action of the centrifugal force. Therefore, the first electrode 121 and the electrode 122 move towards the workpiece 200 relative to the rotatable shaft 11, and the spring 13 is extended. With the rotation of the first electrode 121 and the second electrode 122, electrical discharges are generated respectively between the first electrode 121 and the workpiece 200 that have opposite electric polarities and between the second electrode 122 and the workpiece 200 that have opposite electric polarities, so as to remove material of a portion of the hole 201 of the workpiece 200. Therefore, in combination with FIG. 6, after the workpiece 200 is machined, the hole 201 of the workpiece 200 may have a second diameter D2. The second diameter D2 is greater than the first diameter D1. The rotational angle of the first electrode 121 and the second electrode 122 may be controlled based on the rotary speed of the rotatable shaft 11, thereby further controlling the moving distance of the first electrode 121 and the second electrode 122 relative to the rotatable shaft 11, so as to control a size of the gap 301 between the first electrode 121 and the workpiece 200 and a size of the gap 302 between the second electrode 122 and the workpiece 200. Moreover, a value of the second diameter D2 of the hole 201 of the workpiece 200 after machining may be controlled.

Except that the first electrode 121 and the second electrode 122 of the apparatus 1' for electrically machining according to the second embodiment are slightly different from those of the apparatus 1 for electrically machining according to the first embodiment, the apparatus 1' for electrically machining according to the second embodiment has a structure generally similar to that of the apparatus 1 for electrically machining according to the first embodiment, and can obtain beneficial technical effects generally similar to those of the apparatus 1 for electrically machining according to the first embodiment. Therefore, details are not repeated herein.

Similarly, the apparatus 1' for electrically machining according to the second embodiment may also machine the workpiece 200' shown in FIG. 7 and FIG. 8.

The system 100 for electrically machining shown in FIG. 9 may also use the apparatus 1' for electrically machining according to the second embodiment. Details are not repeated herein.

The foregoing describes the embodiments of the apparatuses 1 and 1' for electrically machining of the present disclosure by using an example in which the electrode 12 includes the two electrodes 121 and 122. However, in the apparatuses 1 and 1' for electrically machining of the present disclosure, the electrode 12 is not limited to including merely the two electrodes 121 and 122.

In another embodiment of the apparatuses 1 and 1' for electrically machining of the present disclosure, the electrode 12 may include a plurality of electrodes, the plurality of electrodes are movably connected to the rotatable shaft 11, and the plurality of electrodes are evenly distributed on the rotatable shaft 11. When the rotatable shaft 11 is rotated, the plurality of electrodes can rotate together with the rotatable shaft 11, and can move towards different directions relative to the rotatable shaft 11 under the action of the centrifugal force. Moreover, a moving distance of the plurality of electrodes relative to the rotatable shaft 11 can be controlled based on the rotary speed of the rotatable shaft 11. The apparatus for electrically machining that uses the plurality of electrodes can obtain beneficial technical effects generally similar to those of apparatuses 1 and 1' for electrically machining that use two electrodes 121 and 122, for example, the apparatus 1 for electrically machining according to the first embodiment and the apparatus 1' for electrically machining according to the second embodiment. The apparatus for electrically machining that uses the plurality of electrodes also has advantages such as a simple structure, a low cost, and ease to implement. In addition, during the machining procedure, the plurality of electrodes can simultaneously move towards the workpiece 200 or 200' in different directions. Therefore, electrical discharges can be generated respectively in gaps between the plurality of electrodes and the workpiece 200 or 200', and the plurality of electrodes can simultaneously perform machining on the workpiece 200 or 200'. Because the plurality of electrodes are evenly distributed on the rotatable shaft 11, force exerted on the apparatus for electrically machining that uses the plurality of electrodes is uniform during the entire machining procedure. Therefore, the apparatus for electrically machining that uses the plurality of electrodes can ensure that a machined surface of the workpiece 200 or 200' has a good flatness.

For the regularly structured workpiece 200 (with reference to FIG. 5 and FIG. 6) and the irregularly structured workpiece 200' (with reference to FIG. 7 and FIG. 8), the apparatus for electrically machining that uses at least more than two electrodes according to the present disclosure can remain uniform force during the machining procedure. Therefore, the workpiece 200 or 200' can obtain a good flatness after the machining.

Certainly, in still another embodiment of the apparatuses 1 and 1' for electrically machining according to the present disclosure, the electrode 12 may also be a single electrode. Similarly, the single electrode is movably connected to the rotatable shaft 11. When the rotatable shaft 11 is rotated, the single electrode can rotate together with the rotatable shaft 11, and can move relative to the rotatable shaft 11 under the action of the centrifugal force. Moreover, a moving distance of the single electrode relative to the rotatable shaft 11 can be controlled based on the rotary speed of the rotatable shaft 11.

It should be understood that, in a case in which the apparatus for electrically machining according to the present disclosure uses a plurality of electrodes or a single electrode, other corresponding structural characteristics of the apparatus for electrically machining may be modified correspondingly. Such simple modifications or equivalent replacements do not depart from the innovation essence of the apparatus for electrically machining according to the present disclosure, and still fall within the protection scope of the apparatus for electrically machining according to the present disclosure.

The apparatus for electrically machining according to the embodiments of the present disclosure has advantages such as a simple structure, a low cost, and ease to implement, and is easy to carry.

Figure 14:
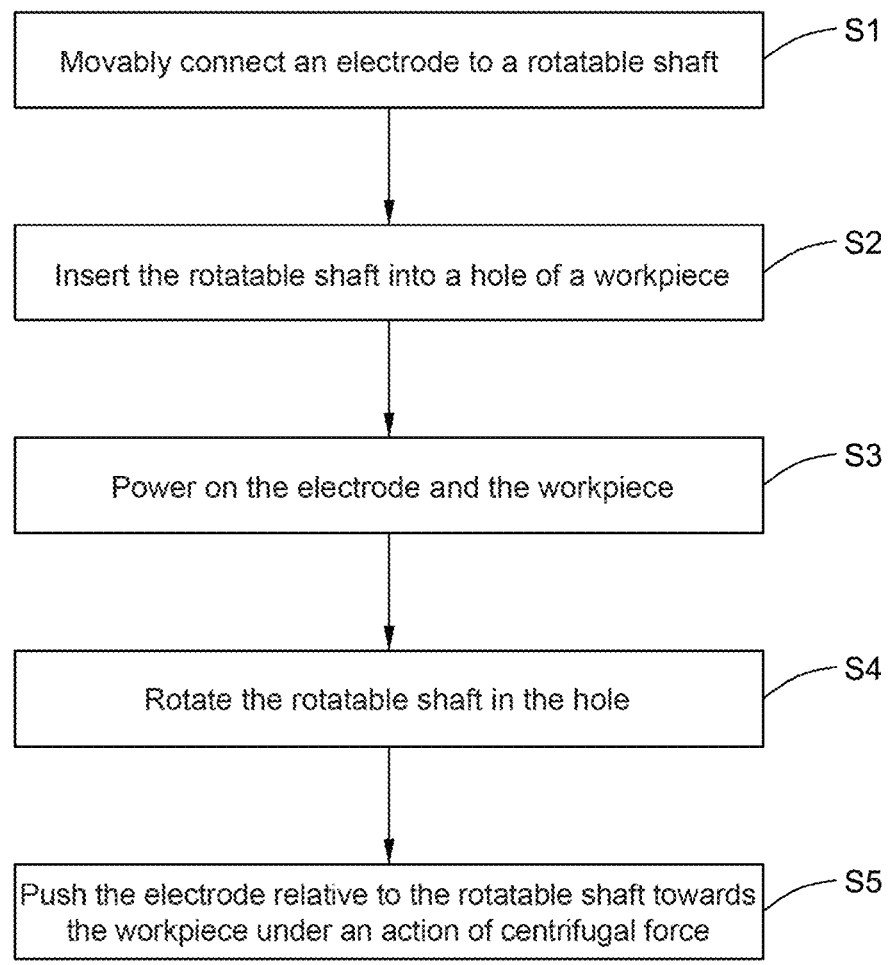
FIG. 14 is a flowchart of a method for electrically machining according to an embodiment of the present disclosure.

FIG. 14 illustrates a flowchart of a method for electrically machining according to an embodiment of the present disclosure. As shown in FIG. 14 and in combination with FIG. 1 to FIG. 4 and FIG. 10 to FIG. 13, a method for electrically machining according to an embodiment of the present disclosure may include the following steps.

In block S1, an electrode 12 is movably connected to a rotatable shaft 11. The electrode 12 may be a single electrode, two electrodes, or a plurality of electrodes. For example, in a case in which the electrode 12 includes two electrodes, such as a first electrode 121 and a second electrode 122, the first electrode 121 and the second electrode 122 are movably connected to the rotatable shaft 11. Moreover, preferentially, the two electrodes 121 and 122 are symmetrically distributed relative to a rotation axis 110 of the rotatable shaft 11. In a case in which the electrode includes a plurality of electrodes, the plurality of electrodes are movably connected to the rotatable shaft 11. Moreover, preferentially, the plurality of electrodes are evenly distributed on the rotatable shaft 11. In an embodiment, the step S1 further includes connecting an elastic element, for example, a spring 13, to the electrode 12, so as to position the electrode 12 relative to the rotatable shaft 11. For example, in the case in which the electrode 12 includes the two electrodes of the first electrode 121 and the second electrode 122, the first electrode 121 and the second electrode 122 may be positioned relative to the rotatable shaft 11 via one spring 13 or two independent springs.

In block S2, the rotatable shaft 11 is inserted into a hole 201 of a workpiece 200, and a certain gap is kept between the electrode 12 and the workpiece 200. When the electrode 12 includes more than two electrodes, a certain gap is kept between each electrode and the workpiece 200. As an example, the hole 201 of the workpiece 200 is a rotation hole, and the hole 201 of the workpiece 200 has a first diameter D1 (as shown in FIG. 5) before machining.

In block S3, the electrode 12 and the workpiece 200 are powered on so that the electrode 12 and the workpiece 200 carry opposite electric polarities.

In block S4, the rotatable shaft 11 is rotated in the hole 201 of the workpiece 200 so as to generate centrifugal force.

In block S5, the electrode 12 is pushed relative to the rotatable shaft 11 towards the workpiece 200 under an action of the centrifugal force, so as to remove material of a portion of the hole 201 of the workpiece 200. Therefore, a ring groove 203 is further formed in the hole 201 of the workpiece 200, so that the hole 201 of the workpiece 200 has a second diameter D2 (as shown in FIG. 6) after the machining. The second diameter D2 is greater than the first diameter D1. When the electrode 12 includes two electrodes, for example, the first electrode 121 and the second electrode 122, the first electrode 121 and the second electrode 122 are pushed towards opposite directions under the action of the centrifugal force. When the electrode includes a plurality of electrodes, the plurality of electrodes are pushed relative to the rotatable shaft 11 towards different directions of a hole wall of the workpiece 200 under the action of the centrifugal force.

A value of the generated centrifugal force may be controlled based on a rotary speed of the rotatable shaft 11, thereby further controlling a moving distance of the electrode 12, so as to control a size of a gap between the electrode 12 and the workpiece 200 and control a value of the second diameter D2. To ensure that the electrode 12 does not move excessively, movement of the electrode 12 may be limited when the electrode 12 moves to a maximum moving distance.

Rotation of the rotatable shaft 11 is properly controlled, so that a portion of the hole 201 of the workpiece 200 after material removing (that is, the ring groove 203) may have a complete cylindrical surface or a part of a cylindrical surface.

In an embodiment, the method for electrically machining may further include: supplying a pressured working fluid to the gap between the electrode 12 and the workpiece 200. For example, in the case in which the electrode 12 includes the two electrodes of the first electrode 121 and the second electrode 122, the pressured working fluid may be supplied to a gap 301 between the first electrode 121 and the workpiece 200 and a gap 302 between the second electrode 122 and the workpiece 200. Therefore, during machining the workpiece 200, scraps generated during the machining procedure can be drained in time, thereby ensuring cleanness of a machining area of the workpiece 200.

In an optional embodiment of the method for electrically machining according to the present disclosure, it may be further detected whether a short circuit occurs between the electrode 12 and the workpiece 200. When it is detected that a short circuit occurs, the rotary speed of the rotatable shaft 11 may be lowered. Therefore, under an action of elastic force of a spring 13, the spring 13 pulls back the electrode 12 so as to increase a size of the gap between the electrode 12 and the workpiece 200, thereby eliminating the short circuit and returning to a normal operating state.

In another optional embodiment of the method for electrically machining according to the present disclosure, it may be further detected whether an open circuit occurs between the electrode 12 and the workpiece 200. When it is detected that an open circuit occurs, the rotary speed of the rotatable shaft 11 may be increased. Therefore, the electrode 12 may further move relative to the rotatable shaft 11, elastic force of a spring 13 increases, and a size of the gap between the electrode 12 and the workpiece 200 is decreased, thereby eliminating the open circuit and returning to a normal operating state.

In still another embodiment of the method for electrically machining according to the present disclosure, the rotatable shaft 11 may further move along the rotation axis 110 of the rotatable shaft 11. Axial movement of the rotatable shaft 11 may be controlled to control axial movement of the electrode 12. For example, axial movement of the rotatable shaft 11 may be continuously controlled so as to control an axial depth of the ring groove 203 machined. Further, axial movement of the rotatable shaft 11 may be intermittently controlled so as to machine a plurality of ring grooves 203 that are distributed at intervals.

Similarly, the method for electrically machining according to the present disclosure may not only machine the workpiece 200 shown in FIG. 5 and FIG. 6, but also machine the workpiece 200' shown in FIG. 7 and FIG. 8.

The method for electrically machining according to the embodiments of the present disclosure has advantages such as a simple structure, a low cost, and ease to implement.

Although the present disclosure is described with reference to embodiments, persons skilled in the art should understand that many modifications and variations may be made for the present disclosure. Therefore, it should be noted that, a purpose of the claims is to cover all these modifications and variations within the essential thoughts and scope of the present disclosure.

What is claimed is:

1. An apparatus for electrically machining, comprising:
    a rotatable shaft; and
    an electrode for electrically machining and which is movably connected to the rotatable shaft;
    wherein, when the rotatable shaft is rotated, the electrode rotates together with the rotatable shaft and moves radially relative to the rotatable shaft under an action of centrifugal force; and
    wherein an amount of radial movement of the electrode relative to the rotatable shaft is based on a rotary speed of the rotatable shaft;
    wherein the rotatable shaft includes a receiving space formed therein for receiving the electrode, the electrode being movable within the receiving space.

2. The apparatus of claim 1, wherein the electrode comprises a first electrode and a second electrode which are positioned relative to the rotatable shaft by a spring or separate springs, and wherein the first electrode and the second electrode move in opposite directions under the action of the centrifugal force.

3. The apparatus of claim 2, wherein the first electrode and the second electrode are symmetrical relative to a rotation axis of the rotatable shaft, with the first electrode and the second electrode translating away from each other under the action of the centrifugal force to opposing ends of a receiving space formed in the rotatable shaft.

4. The apparatus of claim 2, wherein the first electrode and the second electrode are symmetrical relative to a rotation axis of the rotatable shaft, the first electrode and the second electrode have respective own rotation axes, and the first electrode and the second electrode are able to rotate on the respective own rotation axes under the action of the centrifugal force.

5. The apparatus of claim 1, wherein the electrode comprises a plurality of electrodes, and the plurality of electrodes are distributed evenly on the rotatable shaft and move relative to the rotatable shaft towards different directions under the action of the centrifugal force.

6. The apparatus of claim 1, wherein the rotatable shaft comprises a limiting portion for limiting a maximal moving distance of the electrode radially relative to the rotatable shaft.

7. The apparatus of claim 1, wherein the rotatable shaft is movable along a rotation axis of the rotatable shaft.

8. A method for electrically machining, comprising:
    connecting movably an electrode to a rotatable shaft;
    inserting the rotatable shaft into a hole in a workpiece and keeping a gap between the electrode and the workpiece, wherein the hole has a first diameter;
    powering on the electrode and the workpiece;
    rotating the rotatable shaft in the hole to generate centrifugal force;
    pushing the electrode relative to the rotatable shaft towards the workpiece under an action of the centrifugal force to remove material of a portion of the hole so that the hole has a second diameter, wherein the second diameter is larger than the first diameter;
    sensing whether a short circuit happens between the electrode and the workpiece; and
    lowering the rotary speed of the rotatable shaft so that the electrode is pulled back to eliminate the short circuit when it is sensed that the short circuit happens, or
    sensing whether an open circuit happens between the electrode and the workpiece; and
    increasing the rotary speed of the rotatable shaft so as to return to a normal operating state when it is sensed that the open circuit happens.

9. The method of claim 8, wherein connecting movably the electrode to the rotatable shaft comprises respectively connecting movably at least two electrodes to the rotatable shaft and distributing the at least two electrodes evenly on the rotatable shaft; and
    wherein
    pushing the electrode comprises pushing the at least two electrodes radially relative to the rotatable shaft in different directions under the action of the centrifugal force.

10. The method of claim 9, wherein the hole has one end with variable heights in a direction parallel to a rotation axis of the rotatable shaft, the method comprising:
    pushing the at least two electrodes in different directions towards the end of the hole under the action of the centrifugal force to remove material of at least one portion of the end of the hole.

11. The method of claim 8, further comprising:
    supplying a pressured working fluid to the gap between the electrode and the workpiece.

12. The method of claim 8, further comprising:
    connecting a spring to the electrode to position the electrode relative to the rotatable shaft.

13. The method of claim 12, further comprising:
controlling a moving distance of the electrode based on a rotary speed of the rotatable shaft so as to control the gap and control the second diameter.

14. The method of claim 8, further comprising:
limiting movement of the electrode when the electrode moves to a maximum moving distance.

15. The method of claim 8, further comprising:
moving the rotatable shaft along a rotation axis of the rotatable shaft.

16. The method of claim 8 wherein pushing the electrode relative to the rotatable shaft towards the workpiece comprises pushing the electrode radially outward from the rotatable shaft and towards the workpiece.

17. An apparatus for electrically machining, comprising:
a rotatable shaft;
an electrode for electrically machining and which is movably connected to the rotatable shaft; wherein, when the rotatable shaft is rotated, the electrode rotates together with the rotatable shaft and moves radially relative to the rotatable shaft under an action of centrifugal force; and wherein an amount of radial movement of the electrode relative to the rotatable shaft is based on a rotary speed of the rotatable shaft; and
a power supply that provides power to the rotatable shaft, the power supply further configured to:
sense whether a short circuit or an open circuit happens between the electrode and a workpiece being electrically machined by the apparatus;
lower the rotary speed of the rotatable shaft when the short circuit is sensed, so as to eliminate the short circuit; and
increase the rotary speed of the rotatable shaft when the open circuit is sensed, so as to eliminate the open circuit.

18. The apparatus of claim 2, wherein the spring or separate springs comprises a spring connected between the first electrode and the second electrode.

* * * * *